Feb. 4, 1941.  W. H. FITCH  2,230,221

RECUPERATOR TUBE COREBUSTER

Filed Oct. 7, 1939

INVENTOR
William H. Fitch
BY
Albert F. Nathan
ATTORNEY

Patented Feb. 4, 1941

2,230,221

UNITED STATES PATENT OFFICE 2,230,221

RECUPERATOR TUBE COREBUSTER

William H. Fitch, Plainfield, N. J.

Application October 7, 1939, Serial No. 298,411

2 Claims. (Cl. 263—20)

The present invention relates to air and gas heating in tubes and assemblies thereof and the like, and more particularly concerns a refractory or metal insert, commonly known as a corebuster, for such tubes. A primary aim of the invention is to effect a substantial increase in the rate of heat transfer per tube and thereby the efficiency of the heater as a whole.

A recuperator for use in connection with a metal working furnace will be taken as an illustration of a heater wherein the present invention has particular utility. In the ordinary gas fired furnace it is economically impractical to feed atmospheric temperature air to the combustion chamber and expect to attain the high flame temperature and fuel efficiency usually desired. It was discovered, however, that if the air fed to the combustion chamber was preheated, appreciably higher flame temperatures with a reduction in fuel quantity could readily be obtained.

A recuperator device was devised for that purpose and operated to heat the air supply by extracting a substantial portion of the sensible heat from the burned or spent gases of combustion before those gases were conducted to the stack. In its elementary form, a preferred design of recuperator for furnaces comprises a bank of spaced tubes so arranged that the hot gases from the furnace were caused to flow around the outer surfaces of the tubes, thus heating the tubes, while the fresh air supply was fed through the interior of the tubes and became heated by the heat transferred from the inner walls thereof. In some installations one bank of tubes was sufficient to extract enough heat from the burned gases to heat the air supply to the required temperature, whereas, in other installations it was found desirable to arrange two or more banks of tubes in series so that the hot gases passed, preferably in opposite directions, through two spaced banks of tubes while the air to be heated passed through the first bank then to a mixing chamber and then through the second bank of tubes, and so on. In this way air for combustion purposes could be preheated to a relatively high temperature and resulted in a large saving in heat units that heretofore were wasted, and a corresponding saving in the fuel required to heat the furnace.

In my prior patent No. 1,735,605, there is disclosed a furnace and a recuperator device constructed along the lines just mentioned. In this construction, however, each tube has been equipped with a solid rod-like corebuster, the purpose of which was to spread the column of air, as it passed through the tubes, as a layer, about and along the inner periphery of the tube, and to prevent the air from moving as a dead column and unheated through the center of the tubes. This form of streamlined corebuster, while it helped to transfer heat units, did not perform very satisfactorily or efficiently.

The present invention aims to render available an insertable corebuster that will effect a materially greater and faster extraction of the heat from the waste gases and to transfer the heat in a more economical and efficient manner to the air to be heated, than has heretofore been possible or attainable.

A further aim of the invention is to obtain a uniform heating of the air as it passed through any one tube so that the heated air leaving the tube will not have portions chilled or less heated than other portions.

Still a further object of the invention is to render available a corebuster constructed of the unit principle which may be inserted a section at a time in the tubes of existing heaters and be self supporting therein, that is, to make a corebuster unit, adaptable without alteration, to ready insertion in heating tubes of various lengths. The invention further aims toward a corebuster unit that will directly conduct the heat from the walls of the tube throughout its length, and to present materially increased heating areas to the air passing through the tubes. In combination with this feature the invention further aims to create a turbulency in the flow of air through the tubes so that the moving streams of air are repeatedly broken up and agitated to the end that different portions of the air current are repeatedly brought directly into intimate contact with the heating surfaces.

In the prior designs of corebusters such as illustrated in my aforesaid patent, the flow of air through the tube is streamlined in character, the outer layers thereof absorbing heat from the surface of the tube and rod-like core, whereas, mid-sections of the layer never came directly in contact with the heating surfaces. Air being a poor conductor of heat, the results were not very satisfying and large number of tubes and successive banks of tubes were necessary with mixing chambers between banks, in order to obtain air heated to the temperature and in the quantities and rate required. With the present invention, it has now been made possible to obtain an increase in heating efficiency of approximately 45% over the best methods known heretofore.

In attaining the objectives of the present invention, it is proposed to construct a corebuster in units, each relatively short in length. Each unit is, moreover, shaped in end section, like a cross, the outer extreme portions of which are adapted to engage the inner side walls of the heating tube, substantially throughout their lengths. Such a design has a number of important functions, one of which is to bring the tube and corebuster into intimate physical contact whereby the corebuster unit becomes heated not only by convection but by conduction, and another is to provide a materially increased heating surface in contact with the air column. The star-like formation of the corebuster, when inserted in the tube divides the tube interior into a plurality of marginal flues, the effect of which is not only to spread the air column into a plurality of individual streams of relatively thin layers, but to present to both sides of the thin layer of air, a large heating surface.

The particular design of a corebuster unit herein disclosed has four radially extending webs whose exterior surface area, excluding the marginal portions in contact with the tube, is greater than the inner surface area of the tube itself. Inasmuch as the corebuster of the present invention is in physical contact with the tube throughout its length, it takes on substantially the same temperature as that of the tube itself. In consequence, the air that is passed through the marginal flues thereby formed, is caused to come into intimate contact with the maximum area of heating surface which surfaces are, by the present invention, far greater than the heating surface of the tube alone or of a tube equipped with the prior rod-like corebuster, and therefore air passing through the tube becomes heated more rapidly and efficiently than was ever possible heretofore.

By making corebuster units in the form of a star and of relatively short length, a further objective is achieved, namely, when the units are inserted in the tube, each unit after the first, may be positioned angularly out of phase with the preceding unit, thus forming a succession of sharp bends to the air flow in the marginal flues. That is, the end face of each web section, in the direction of flow of air, is preferably positioned in line with the flue or space between the webs of an adjacent section so that the air leaving each marginal flue of each section strikes the end face of the next section and is deflected thereby laterally. By so staggering individual sections as to laterally deflect and divide the flow, the deflected currents leaving a preceding flue will pass through two flues of the next following section, where it mixes with fractions similarly divided and deflected by adjoining partitions of the web inserts.

The repeated deflecting and dividing of the air columns into fractions and directing different fractions to different flues, causes a high degree of turbulency and mixing of the total air in the tube to take place within the tube itself. Heated layers become mixed with less heated layers, and less heated layers forced directly into contact with the heating surfaces of the tube and its core.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which—

Figure 1:
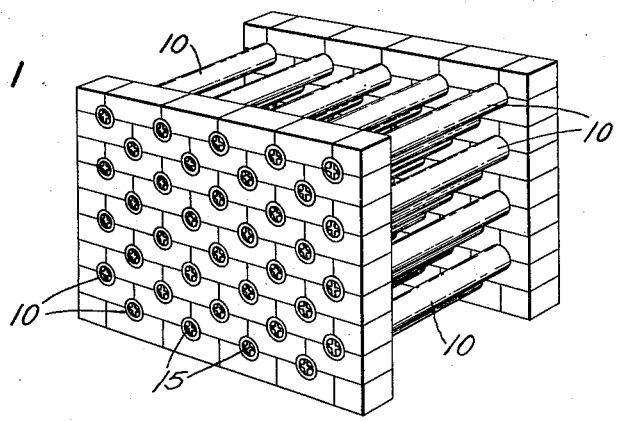
Figure 1 illustrates an unwalled bank of heating tubes embodying the present invention.
Figure 2:
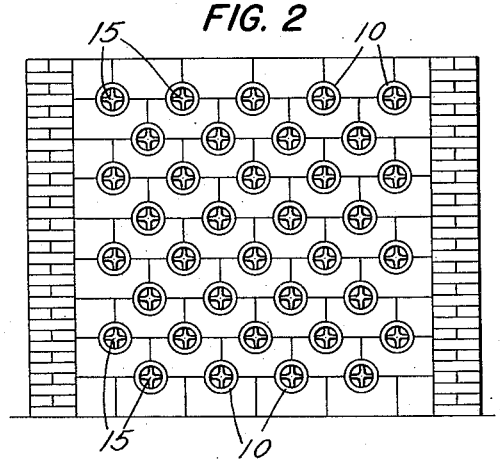
Figs. 2 and 3 are, respectively, end and side views thereof.
Figure 3:
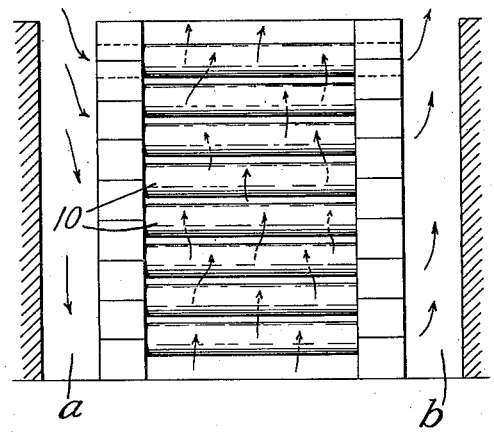

With reference to Figs. 1, 2 and 3, the heating unit illustrated is constructed along conventional lines and comprises a series of tubes 10 arranged in horizontal rows with the tubes of intervening rows staggered to obtain a more uniform distribution of the hot gases about the external surface of each tube. As illustrated in Fig. 2, the heating medium passes through the interstices between the tubes and heats the walls thereof. With tubes made of silicon carbide the heat is quickly transferred to the interior of the tubes substantially uniformly about its periphery. Such use of silicon carbide is known for its high thermal conductivity and refractoriness, withstanding temperatures up to 4000° F. without fusing or softening, and in other respects, is ideal for this purpose.

Fig. 3 illustrates one method of conducting the air to be heated through the interior of the tubes while the heating gases pass over the exterior in a transverse direction. When desired a second heating bank may be connected in series. In operation, air to be heated is conducted to the duct a where it enters the open ends of the heating tubes and then flows through the tubes into the duct b which leads to the furnace or other point of use as may be required.

Figure 4:
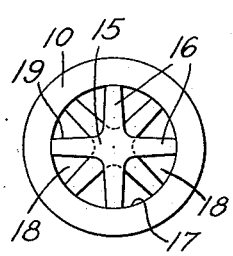
Fig. 4 is an end view of a tube illustrating a preferred relation of corebuster units constructed in accordance with this invention.
Figure 6:
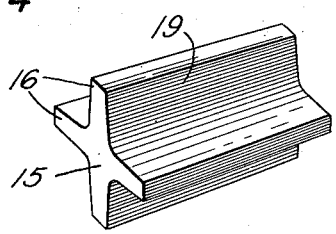
Fig. 6 is a perspective view of the corebuster removed from the tube.

Fig. 4 illustrates a section of the tube having a corebuster insert constructed in accordance with the present invention. With regard to Figs. 4 and 6, the corebuster section 15 is relatively short in length (approximately 1½ times its diameter) and is made in the form of a cross. Each lateral web 16 thereof extends radially a distance sufficient to fill the core space 17 of the tube 10. When inserted in the tube the four webs divide the interior into four marginal compartments or flues 18 each of which is relatively shallow in depth. Inasmuch as the webs 16 extend the full length and width of each unit and engage the side walls of the tube along their full length, the corebuster section as a whole quickly assumes substantially the same temperature as the tube itself. Such temperature being conducted directly to the insert through the web portions 16, as well as by convection through the shallow air spaces between the webs.

It has been found that in corebusters of this general design that any suitable refractory material, such as ordinary fire clay may be used economically and efficiently for the purpose, and the design itself being void of complexities in its construction lends itself readily adaptable to be produced inexpensively.

As hereinbefore mentioned, a longitudinally fluted corebuster has many advantages among which may be noted that each of the exterior surfaces 19 thereof presents a considerable expanse of heating area to the column of air that is passed thereover. And as the shape of the unit divides the interior of the tube into a plurality of marginal flues, the air is spread in relatively thin layers into contact with the marginal and hottest regions of the tube. With the present construction of corebuster the surfaces 19 thereof also attain a high heat, and transfer heat to the moving layers of air that are nearer the axis of the tube. In this way each side of a relatively thin layer of air becomes quickly heated.

With a core shaped and proportioned substantially as shown in Fig. 4, the core itself occupies about a third of the total tube area. This fact, however, improves the heating effect by reason of the air being compressed slightly and therefore held in more intimate contact with the heating surfaces, as it passed through. Under normal conditions of operation the average air velocity through the tubes is approximately 25 feet per second, and the heater embodying the present invention has been found under test to transfer as much as 32 B. t. u.'s per tube per hour per degree F. difference in temperature, as compared with the maximum transfer of only 22 B. t. u.'s under like conditions, with a heater equipped with the old style of rod-like corebuster. This remarkable increase in exchange of heat units represents a 45% increase in efficiency of the exchanger and definitely shows that either the total number of tubes used in the exchanger may be substantially reduced by the present invention, or that the same number of tubes so equipped will effect a considerable increase in the temperature of the air passing therethrough.

This ability to greatly increase the rate of heat transfer of a single tube or a bank of tubes is due not only to the increased area of surface radiation of the core, but also due to a violent agitation and mixing of the air effected by this invention, as it is passed through the marginal flues. A high degree of turbulency within the tube such as will cause all portions of the air streams to intimately mix within the tube and be repeatedly deflected within the tubes into close association with the heated surfaces, may be attained by positioning the respective cores in the tube in staggered relation with adjacent core units.

Figure 5:
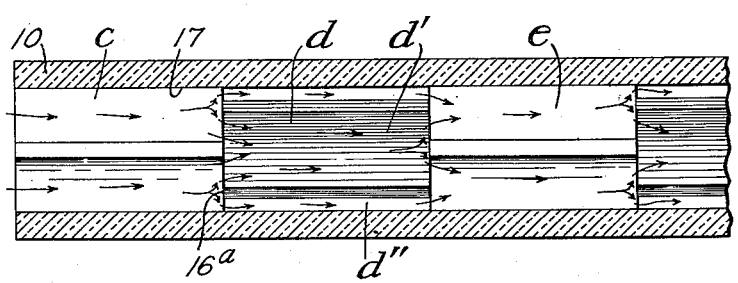
Fig. 5 is a longitudinal sectional view of a tube illustrating by arrows the bent and deflected paths of the air currents.

Figs. 4 and 5 of the drawing illustrate the staggered relation just mentioned in which the unit marked c is positioned approximately 90° out of phase with the unit marked d, and the unit d similarly out of phase with the unit e, and so on. The purpose of the staggered relationship is to positively and repeatedly break up each marginal stream of air into a plurality of intermingling streams as it passes from section to section through the tube.

With reference to Fig. 5, the flow of air through one flue of the unit c is represented by the arrows. When the stream reaches the end wall 16ª of the next section d the air is positively deflected laterally, one fraction flowing through the flue d' and the other fraction flowing through the flue d''. The stream of air in flue d' mixes with another fraction directed therein and is again deflected laterally into two paths as it reaches the next section e, and so on throughout the length of the tube. This dividing and deflecting of the air streams not only causes an intermingling of the air particles definitely to occur, but the successive dividing and deflecting causes the air to flow somewhat spirally in opposite directions during its progress through the tube.

By virtue of this arrangement all portions of the air column entering the tube at one end is caused definitely to come in intimate contact with the hot surfaces of the tube and core and the heat thereof is quickly and efficiently transferred.

In such an assembly of staggered corebuster units no central layer or layers of air are permitted to flow undisturbed through the tube and as a result every particle of air introduced into the tube performs its duty of taking up heat from the various heating surfaces. By this invention it will be observed, not only is a quantity of air heated more rapidly, but more of the valuable heat units are quickly extracted from the tube heating medium. With the same number and size of heating tube, the temperature of a given quantity of air may be quickly raised to a predetermined degree in a highly efficient manner, or conversely, considerably fewer number of tubes equipped with corebusters embodying the principles of this invention are required to perform the same work that heretofore could be accomplished only with a relatively large bank of tubes. Consequential savings not only in the material used in the construction of a heater, but in valuable space required therefor, and in the amount of fuel consumed, whether or not the fuel be used for firing the furnace or solely as a means for heating the air for other purposes such as drying various materials, has been effected by the present invention.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A recuperator comprising a bank of cylindrical tubes through which air is continuously forced or drawn to be heated, said tubes being spaced from each other to afford passageways for the simultaneous flow of tube heating medium transversely about their external surfaces, a plurality of elongated sections of refractory material adapted to be inserted within each of said cylindrical tubes and to be self-supporting therein in engagement with the curved inner walls thereof, each of said sections being formed with a plurality of radiating webs having end faces lying in planes substantially perpendicular to the horizontal axis of the section which, when inserted in a tube, divide the interior of the tube adjacent the said section into a plurality of spaced marginal ducts extending longitudinally of the tube, and each succeeding section being adapted to be positioned in each of said tubes angularly out of phase with a preceding section so that the flat end faces of the webbed sections lie, with respect to the direction of air flow, in the spaces between the webs of adjacent sections and serve as abutments to divide and deflect the air stream flowing from each marginal duct of each section in a lateral direction thereby creating turbulency in the flow of air and repeated intermingling of the deflected marginal streams within the length of the tube during the course of the flow of air therethrough.

2. An air duct for a recuperator through which only the air to be heated is adapted to flow and only in one direction comprising a horizontally disposed cylindrical tube and a plurality of independently insertable sections of refractory material placed therein and supported by the curved inner wall of the tube, each of said insertable sections being self-supporting and shaped to divide the interior of the tube adjacent each section into at least four relatively shallow marginal passageways, and each of said sections being formed with substantially flat end surfaces arranged perpendicular to the air flow and each occupying a position in the tube angularly out of phase with the adjacent sections so that each succeeding sectional insert divides and deflects the air streams leaving the marginal passageways of the adjacent preceding section, thereby to effect in the aggregate, a thorough and repeated mixing of all portions of the air column within the tube and during the course of the flow of air through the tube.

WILLIAM H. FITCH.